Feb. 5, 1957
JEANNE CHARLOTTE LÉA BLOCH
NEÉ BOULANGER-MONTEGU
PROCESS FOR PREPARING A CONFECTIONERY
PRODUCT CONTAINING PEANUTS
Filed Dec. 20, 1954
2,780,549
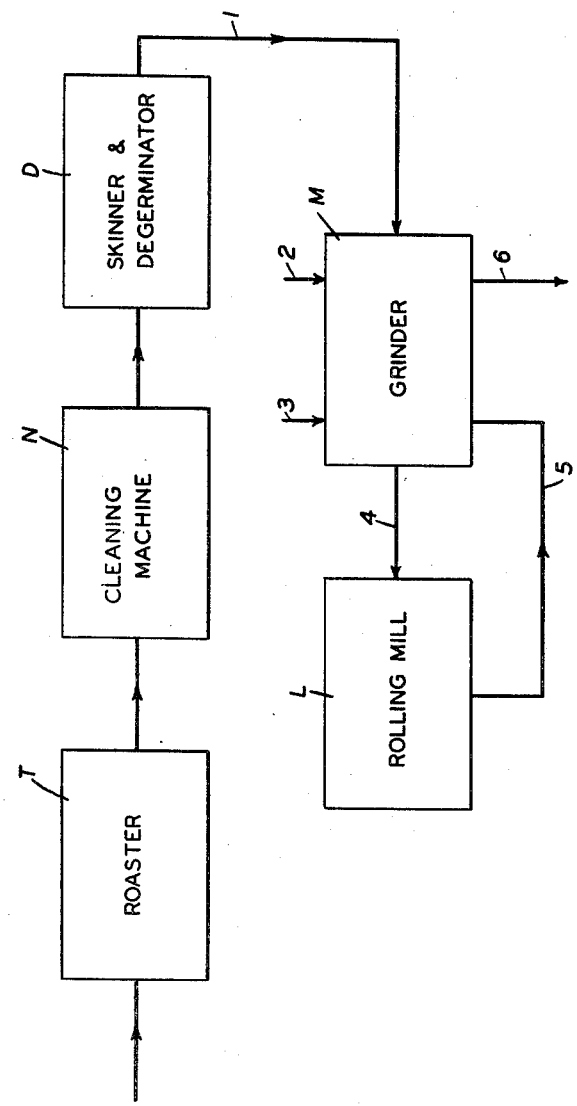
INVENTOR
JEANNE CHARLOTTE LEA BLOCH
NEÉ BOULANGER-MONTEGU.
BY
Mock & Blum
ATTORNEYS.

United States Patent Office 2,780,549
Patented Feb. 5, 1957

2,780,549

PROCESS FOR PREPARING A CONFECTIONERY PRODUCT CONTAINING PEANUTS

Jeanne Charlotte Léa Bloch, née Boulanger-Montegu, Paris, France, assignor to Société Industrielle de Produits Africains, Dakar, French West African Territory, a joint-stock company of the French West African Territory Application December 20, 1954, Serial No. 476,489

Claims priority, application France June 25, 1954

2 Claims. (Cl. 99—126)

This invention relates to food products containing peanuts and it has particular relation to food products in which the peanuts are present in mixture with other nutritive materials, particularly sugar and cocoa. The invention also relates to a process for preparing such food products.

The main object of the present invention is to provide a process for preparing a nutritive product, by using as starting material peanuts and other ingredients which are united to a mixture. This mixture is subjected to a treatment for obtaining an extremely fine powder which is subsequently converted in to a unctuous paste by malaxation.

For the final malaxation said powder can be returned with advantage to the same grinding and mixing device in which the mixture was originally prepared.

The main ingredients which are mixed with the peanuts according to the present invention are sugar and cocoa.

Prior to submitting the mixture to conversion into a fine powder, flavoring materials such as vanilla or other spices can be incorporated therein.

Other objects and the advantages of the invention will be apparent from the specification and claims and the appended drawing, which illustrate by way of example and without limitation a best mode of carrying out the invention.

Referring now to the drawing in detail according to the process of the invention, the peanuts are first of all roasted in conventional manner in roaster T.

After roasting, the peanuts are classified and then introduced into a cleaning machine N in which dust and other waste products are eliminated by a current of "polarized" air.

The completely cleaned peanuts are subsequently stripped from their skin and are degerminated by causing the peanuts to pass through a suitable machine D which separates the skin and frees the peanuts from germs, in conventional manner.

The split peanuts discharged from the degerminating machine are then introduced through conduit 1 into a machine for grinding and malaxation and are then mixed with cocoa (2) which can be flavored or not and with sugar (3) in order to form a paste of a certain softness in which the individual ingredients cannot be distinguished anymore.

After a certain lapse of time this paste is caused to pass through a rolling mill L in order to convert it into a powder of extreme fineness.

This powder is now again introduced (5) into the device M, which has been used for mixing and in this device the powder is converted into a characteristic unctuous paste.

In the final product 6 the cocoa is present in an amount of 6 to 10%, while each of the sugar and the peanuts are present in an amount of 40 to 45% by weight. A characteristic end product contains, for example, 8.0% cocoa, 46.0% sugar and 46.0% peanuts, by weight.

Although the proportion of cocoa in the end product is relatively low, in the above mentioned manner nevertheless a product is obtained, in which the flavor and the intensity of scent are similar to those of a genuine chocolate fondant praline.

The end product thus obtained has a considerable nutritive value. Moreover it contains phosphorus, calcium, iron, protein and amino acids which are necessary for growth and other vital functions.

The product of the invention is a delicious sweet which can be consumed in the same condition in which it is directly obtained in the above described process of its manufacture, i. e. in the form of a paste which is sufficiently unctuous and dense. In view of these characteristics the products of the invention can be very advantageously consumed as a spread, for example on bread, on toasted bread or biscuits.

It can be well incorporated in pastry, sugared plates, desserts, ice cream, and contributes in these uses to the flavor and nutritive value of the respective products. Finally, its conservation is excellent.

The term "polarized air" is used in the present application to denote electrically charged air which electrifies dust and other waste products in order to facilitate their elimination.

What is claimed is:

1. A process for preparing a food product from roasted peanuts, sugar and cocoa, comprising subjecting split, degerminated peanuts to grinding and malaxation and then mixing them with cocoa and sugar in order to form a paste; causing this paste to pass through a rolling mill in order to convert it into a powder; and subjecting this powder to grinding and malaxation in order to convert it into an unctuous paste.

2. A process as claimed in claim 1, in which 40–45% of peanuts, 40–45% of sugar, 6–10% of cocoa and a flavoring material are used.

References Cited in the file of this patent

UNITED STATES PATENTS

| | | |
|---|---|---|
| 1,142,346 | Mariner | June 8, 1915 |
| 1,158,297 | Root | Oct. 26, 1915 |